June 24, 1924.
H. W. PLEISTER
BOLT ANCHOR
Filed March 28, 1923
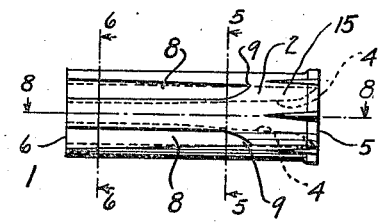
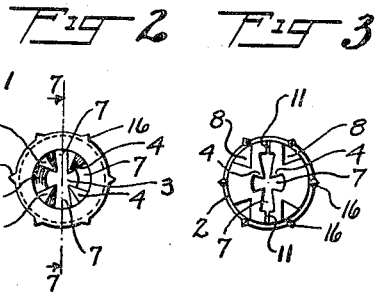
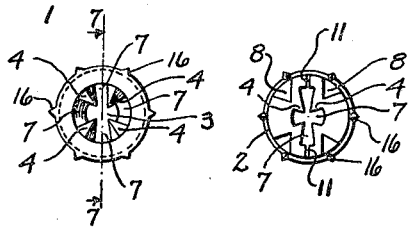
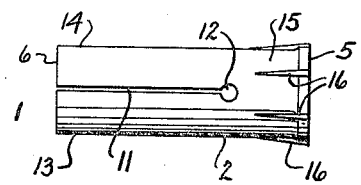
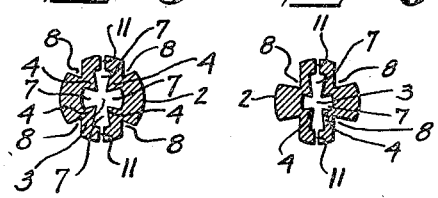
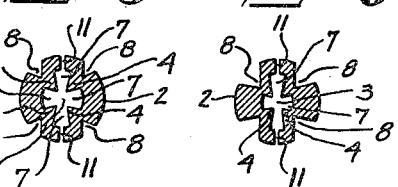
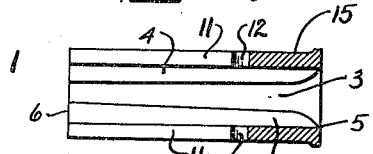
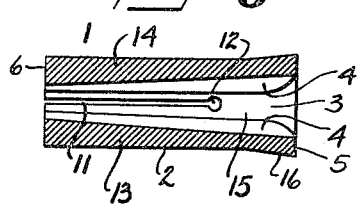
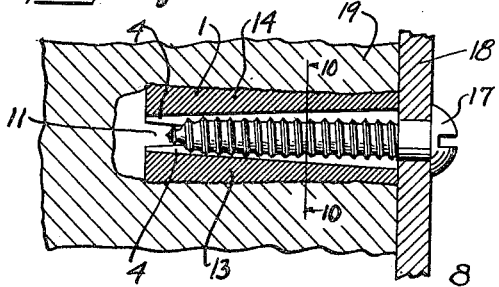
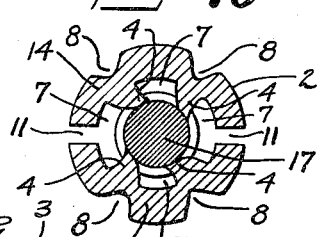
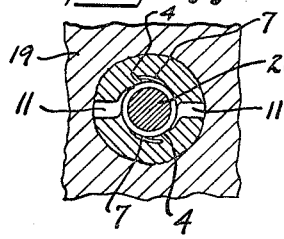
INVENTOR
Henry W. Pleister
BY
Alavin Johnson
ATTORNEY Patented June 24, 1924.

1,499,071

UNITED STATES PATENT OFFICE.

HENRY W. PLEISTER, OF WESTFIELD, NEW JERSEY, ASSIGNOR TO HENRY B. NEWHALL.

BOLT ANCHOR.

Application filed March 28, 1923. Serial No. 628,265.

*To all whom it may concern:*

Be it known that I, HENRY W. PLEISTER, a citizen of the United States, residing at Westfield, in the county of Union and State of New Jersey, have made a certain new and useful Improvement in Bolt Anchors, of which the following is a specification, taken in connection with the accompanying drawings.

My invention relates to bolt anchors and more particularly to a ductile bolt anchor which will permit a particular sized bolt anchor to be used with the greatest possible range of screws, or other expanding means, of different sizes or diameters.

My invention further relates to an article of manufacture, combinations and details of construction, which will be more fully hereinafter described in the specification and pointed out in the claims.

In the accompanying drawings showing an illustrative embodiment of my invention, and in which the same reference numerals refer to similar parts in the several figures;

Fig. 1 is a side elevation of the preferred form of my bolt anchor;

Fig. 2 is a front elevation, looking into the ductile bolt anchor;

Fig. 3 is a rear elevation, looking into the bolt anchor;

Fig. 4 is a plan view;

Fig. 5 is a cross-section on the line 5—5 of Fig. 1;

Fig. 6 is a cross-section on the line 6—6 of Fig. 1;

Fig. 7 is a vertical section on the line 7—7 of Fig. 2;

Fig. 8 is a horizontal section on the line 8—8 of Fig. 1;

Fig. 9 is a vertical section through a wall or other suitable support, the work and the bolt anchor, a small screw being shown, co-operating with the bolt anchor;

Fig. 10 is a vertical section on the line 10—10 of Fig. 9; the view being on an enlarged scale for purposes of clearer illustration;

Fig. 11 is a cross-section, similar to Fig. 10, though on a smaller scale, and showing the position of the longitudinally extending interior ribs, and the longitudinally extending valleys, when a large screw is employed in the same ductile bolt anchor;

Fig. 12 is a longitudinal sectional view, similar to Fig. 8, taken through the valleys.

In installing attachments, such as electrical fixtures, insulator brackets, cable clamps, bridle rings, or any form of attachment, which vary in size and duty to be performed, different size bolt anchors and particular size screws, to fit the particular size bolt anchor have to be used. This requires a contractor to keep in stock and to send out his mechanics with several sizes of bolt anchors and corresponding sizes of screws, to fit the different size bolt anchors. To drill the holes for the ductile bolt anchors, different size drills to correspond with the particular size ductile anchor, have to be bought and kept on hand.

By my present invention I permit work, of the greatest possible range, to be held to a wall or other suitable support by a ductile anchor of a given size. In my present invention, for example, with a given size ductile anchor I may use variable diameters of screws, for example, from #8 to #14. This eliminates the necessity of the contractor carrying in stock ductile anchors of intermediate sizes. This also permits the contractor to equip his mechanics with one size ductile anchor and one size drill to perform practically all the work that they will be required to perform on a given job, which ordinarily would require different size bolt anchors and corresponding screws. It will be seen, therefore, that his investment in ductile anchors need be only a few sizes, for each size will accommodate four, five or more sizes of screws, bridle rings or other expanding means. My invention also saves confusion and error on the part of the mechanics in using the wrong bolt anchor, in the wrong place and greatly simplifies the work and reduces the cost of installation.

I have shown in the accompanying drawings one form of my invention in which the ductile bolt anchor is provided with interior and exterior longitudinally extending voids which may be filled up, more or less, by the metal of the ductile anchor, depending upon the degree of expansion employed. For example in using the smallest screw, or other expanding means, the voids on the interior and exterior of the ductile anchor will not be substantially changed from their original condition, for the small screw will simply engage with the longitudinally extending ribs and in this manner expand the bolt anchor, giving a firm and strong grip on the interior of the wall or other suitable support. With a larger screw, the metal of the bolt anchor will be more or less displaced, so that the voids on the interior and exterior will be more or less filled up. With a screw of the maximum diameter, for the particular size bolt anchor, the metal of the bolt anchor will be put under such pressure and so distorted, as to substantially fill up all the interior and exterior voids.

I have shown in the drawings one form of my invention in which 1 is a ductile bolt anchor, formed of any suitable ductile material, such as lead or an alloy, provided with a uniform outer circumference 2, and an inclined axial bore 3, provided with longitudinally extending ribs 4, 4 of progressively decreasing height from the outer end 5 to the inner end 6 of the bolt anchor. These interior longitudinally extending ribs 4, 4 form interior longitudinally extending voids 7, 7.

I cut, cast or otherwise form longitudinally extending valley 8, 8 in the exterior surface 2 of the bolt anchor, the valleys preferably being of progressively greater depth from the points 9, 9 to the end 6 of the bolt anchor. This makes the exterior valleys of the greatest depth at the end 6 of the bolt anchor where the greatest expansion is exerted and allows for the greatest displacement of metal when the largest screws are used. These longitudinally extending valleys, which form exterior voids, are preferably arranged parallel to the interior longitudinally extending ribs 4, 4 and are in substantial radial alinement with them.

My bolt anchor is provided with the usual slots 11, 11 to permit more ready expansion of the bolt anchor, the slots terminating at 12, 12 and forming two tines 13 and 14 which are connected to the body member 15, which is formed as a ring. On the exterior of the body member 15, I may form one or more longitudinally extending ribs 16, 16 raised above the exterior cylindrical surface 2 of the bolt anchor to engage with the surface of the hole and prevent turning of the bolt anchor, as the screw 17 is screwed into the bolt anchor to expand it.

For purposes of illustrating the advantages of my invention, and the wide range of screws which may be used with one size bolt anchor, I have shown a bolt anchor which will work perfectly and most advantageously with wood screws, known in the trade from #8 to #14. In Figs. 9 and 10, I have shown the screw, for example as size #8, which is the screw numbered 17 on the drawing. This screw passes through the work 18 and holds it to the wall or other suitable support 19, by cooperating with and cutting its own threads within the interior longitudinally extending ribs 4, 4. It will be seen from the large view, Fig. 10, that the small size screw, for example #8, does not substantially bend or wipe over the longitudinally extending ribs 4, 4 and, therefore, does not fill up the voids 7, 7 on the interior of the bolt anchor lying between the longitudinal ribs 4, 4. A very powerful and adequate expansion, however, is obtained for the particular load represented by the work 18.

When the work 18 is heavier, a larger screw than #8 will be employed with the same bolt anchor 1. The next size screw will bend over the longitudinally extending ribs 4, 4 a little more than they are shown in Fig. 10. With the largest size screw, which can be used with a particular size bolt anchor, for example No. 14 with the particular sized bolt anchor shown, the longitudinally extending ribs 4, 4 will be distorted or wiped over until they substantially fill up the voids 7, 7. On a smaller scale the position and distortion of the metal of the bolt anchor is shown in Fig. 11, where the interior voids 7, 7 are substantially filled up by the larger screw 20 distorting the longitudinally extending ribs 4. At the same time this large screw will exert such an expansion that the exterior surface of the bolt anchor will be so distorted that the exterior voids formed by the valleys 8, 8 will be filled up and practically eliminated, as shown in Fig. 11.

By arranging the exterior valleys 8, 8 parallel to the interior longitudinal ribs 4, 4 and in radial alinement with said interior ribs, the metal just back of the ribs will be readily forced radially and fill up the voids formed by said valleys. By arranging the valleys in this manner, I also get a bolt anchor of the same strength with less metal, which materially decreases the cost of manufacture.

While I have, for purposes of illustration, referred to screws #8 and #14 it is, of course, to be understood that with a different size bolt anchor, other sizes of screws, within wide ranges, can be used.

Having thus described this invention in connection with an illustrative embodiment thereof, to the details of which I do not desire to be limited, what is claimed as new and what is desired to secure by Letters Patent is set forth in the appended claims.

What I claim is:—

1. A new article of manufacture comprising a ductile anchor having a body member and a plurality of separated tines connected to the body member, the anchor having an axial bore provided with longitudinally extending ribs of gradually decreasing height from the front to the rear of the anchor, the exterior of the bolt anchor being provided with longitudinally extending valleys, said valleys being parallel to the interior ribs and in substantial radial alinement with them, so that when a screw of maximum diameter is employed to expand the anchor the metal just back of the interior ribs will be readily forced radially and fill up the valleys on the exterior of the anchor.

2. A new article of manufacture comprising a ductile anchor having a body member and a plurality of separated tines connected to the body member, the anchor having an axial bore provided with longitudinally extending ribs of gradually decreasing height from the front to the rear of the anchor, the exterior of the bolt anchor being provided with longitudinally extending valleys increasing in depth from the front of the anchor to the rear, said valleys being parallel to the interior ribs and in substantial radial alinement with them, so that when a screw of maximum diameter is employed to expand the anchor the metal just back of the interior ribs will be readily forced radially and fill up the valleys on the exterior of the anchor to permit the maximum displacement of the metal of the anchor to take place at the rear of the anchor.

HENRY W. PLEISTER.

Witnesses:
MARY R. RYAN,
MARGUERITE E. KUHN.